US008589216B2

(12) United States Patent
Yu et al.

(10) Patent No.: US 8,589,216 B2
(45) Date of Patent: Nov. 19, 2013

(54) INTELLIGENT CHARGING SYSTEM AND METHOD FOR USE IN A PARKING LOT

(75) Inventors: Zhilu Yu, Beijing (CN); Daxing Xu, Beijing (CN)

(73) Assignee: Beijing Watch Data System Co., Ltd., Beijing (CN)

( * ) Notice: Subject to any disclaimer, the term of this patent is extended or adjusted under 35 U.S.C. 154(b) by 3 days.

(21) Appl. No.: 13/213,946

(22) Filed: Aug. 19, 2011

(65) Prior Publication Data
US 2012/0054098 A1 Mar. 1, 2012

(30) Foreign Application Priority Data

Aug. 20, 2010 (CN) .......................... 2010 1 0259629

(51) Int. Cl.
*G07B 15/02* (2011.01)
*G06Q 40/00* (2012.01)

(52) U.S. Cl.
USPC .............................................. 705/13; 705/40

(58) Field of Classification Search
USPC ..................................................... 705/13, 40
See application file for complete search history.

(56) References Cited

U.S. PATENT DOCUMENTS

| 4,310,890 | A | * | 1/1982 | Trehn et al. | 705/418 |
|---|---|---|---|---|---|
| 4,847,776 | A | * | 7/1989 | Huang | 705/418 |
| 5,166,680 | A | * | 11/1992 | Ganot | 340/932.2 |
| 5,351,187 | A | * | 9/1994 | Hassett | 705/13 |
| 5,721,678 | A | * | 2/1998 | Widl | 705/417 |
| 5,940,481 | A | * | 8/1999 | Zeitman | 705/13 |
| 6,102,285 | A | * | 8/2000 | Elias | 235/377 |
| 6,342,844 | B1 | * | 1/2002 | Rozin | 340/933 |
| 6,493,676 | B1 | * | 12/2002 | Levy | 705/13 |
| 6,535,143 | B1 | * | 3/2003 | Miyamoto et al. | 340/933 |
| 6,697,714 | B1 | * | 2/2004 | Høj | 701/1 |
| 7,119,674 | B2 | * | 10/2006 | Sefton | 340/521 |
| 7,215,255 | B2 | * | 5/2007 | Grush | 340/932.2 |
| 7,466,223 | B2 | * | 12/2008 | Sefton | 340/521 |
| 2002/0111851 | A1 | * | 8/2002 | Folkers | 705/13 |

(Continued)

FOREIGN PATENT DOCUMENTS

| CN | 1157445 A | 8/1997 |
|---|---|---|
| CN | 1240285 A | 1/2000 |

(Continued)

OTHER PUBLICATIONS

Watchdata ("Watchdata's ETC Products Open to Market," Aug. 6, 2009, http://www.watchdata.com/press/10046.html, pp. 1-2).*

(Continued)

*Primary Examiner* — Kenneth Bartley
(74) *Attorney, Agent, or Firm* — McDermott Will & Emery LLP

(57) ABSTRACT

The present invention provides an intelligent charging system and method for use in a parking lot. The system comprises a detecting unit, an on-board unit and a corresponding means of payment. The on-board unit is disposed on a vehicle and configured to acquire a parking time parameter, derive a parking fee according to the parking time parameter and a rate parameter stored in the on-board unit, and deduct the parking fee from the means of payment. The detecting unit is configured to, through information interaction with the on-board unit, determine whether the on-board unit operates normally. The present invention can be used to reduce the investment cost and improve the monitoring management of public parking lots.

14 Claims, 6 Drawing Sheets

(56) References Cited

U.S. PATENT DOCUMENTS

| | | | |
|---|---|---|---|
| 2005/0021459 A1* | 1/2005 | Bell | 705/40 |
| 2005/0228715 A1* | 10/2005 | Hartig et al. | 705/13 |
| 2006/0255119 A1* | 11/2006 | Marchasin et al. | 235/375 |
| 2006/0259354 A1* | 11/2006 | Yan | 705/13 |
| 2007/0061192 A1* | 3/2007 | Chew | 705/13 |
| 2007/0247333 A1* | 10/2007 | Borean et al. | 340/932.2 |
| 2008/0052254 A1* | 2/2008 | Al Amri | 705/418 |
| 2008/0270227 A1* | 10/2008 | Al Amri | 705/13 |
| 2008/0319837 A1* | 12/2008 | Mitschele | 705/13 |
| 2009/0216687 A1* | 8/2009 | Burdick | 705/418 |
| 2011/0063079 A1* | 3/2011 | Groft et al. | 340/10.1 |

FOREIGN PATENT DOCUMENTS

| | | |
|---|---|---|
| CN | 1068128 C | 7/2001 |
| CN | 201145916 Y | 11/2008 |
| CN | 201532657 U | 7/2010 |
| JP | 2001-223650 A | 8/2001 |
| JP | 2003-150991 A | 5/2003 |
| JP | 2006-039855 A | 2/2006 |
| JP | 2010-144485 A | 7/2010 |
| KR | 2002-0086376 A | 11/2002 |
| KR | 2004-0097560 A | 11/2004 |
| WO | 2004021304 A1 | 3/2004 |
| WO | 2007107001 A1 | 9/2007 |

OTHER PUBLICATIONS

Watchdata, Watchdata Sets another Milestone: Providing the First CEPAS-compliant Debit Co-brand Card in Singapore, Dec. 14, 2009, http://www.watchdata.com/press/10025.html, pp. 1-2.*

Watchdata, "Quipass ETC solutions," Mar. 2009, http://www.watchdata.com.cn/2012/solutions/tra4.jsp, pp. 1-2.*

Office Action issued in French Patent Application No. 1157421 dated Nov. 2, 2011.

Office Action issued in Singapore Patent Application No. 201106056-3 dated Jun. 6, 2012.

* cited by examiner

INTELLIGENT CHARGING SYSTEM AND METHOD FOR USE IN A PARKING LOT

TECHNICAL FIELD

The present invention relates to the technical field of charging in a parking lot, and more particularly, to an intelligent charging system and method for use in a parking lot.

BACKGROUND OF THE INVENTION

Presently, with development of the automobile industry and improvement of the urban traffic environments, the number of automobiles is increasing steadily. As a consequence, the parking problem becomes increasingly prominent in urban areas, and a lot of public parking lots have appeared correspondingly.

Public parking lots, also termed as roadside temporary parking lots, refer to places on roads or at the roadsides where vehicles can be parked and managed at a cost. Such public parking spaces are open without distinct entrances and exits. Because they allow people to park their vehicles conveniently and rapidly, the public parking lots have become indispensable to modern cities with an increasingly larger traffic flow.

The public parking lots are usually distributed dispersedly and it is difficult to collect the parking space information, so charging and management are usually carried out in a manual way by deploying a monitoring station. That is, vehicles temporarily parked within a specific range are charged by an administrator according to the parking duration; and generally, a start parking time is recorded manually for each vehicle and, when the vehicle is to leave a parking lot, a parking duration is calculated and a corresponding fee is charged by the administrator who will also gives a receipt note. However, this way of manually charging and management for the public parking lots has the following disadvantages:

1. the coverage is limited: it is impossible for the fixed manual parking management stations to cover every corner of a city;
2. it has a low efficiency and wastes the human resource: because at least one administrator must be assigned in each monitoring station, the human resource cannot be utilized efficiently; and
3. the cash flow is relatively large, so it is difficult to monitor each monitoring station.

In order to solve the problems associated with the way of manually charging and managing, a few metropolises have attempted to use parking meters for charging management of public parking lots in accordance with experiences of foreign countries. However, although the parking meters are convenient to use and highly efficient, can operate accurately and allow for unattended operation, they also have the following disadvantages:

1. they are costly: each mechanical parking meter costs about RMB 2000~5000, and non-contact parking meters are even more costly.
2. the infrastructure installation cost and the maintenance cost are both high: installation of the parking meters, embedding of lines and the like all represent a high work load, and because the parking meters are exposed to sunlight and rains, they are very liable to aging and even sometimes to man-caused damage, which results in a maintenance cost;
3. they occupy spaces of the roads or the parking lots, and adversely affect the appearance of cities; and
4. unattended operation still cannot be achieved in practical use.

Therefore, the way of management by using the parking meters is costly but does not allow for low-cost operation, so it fails to be widely used.

Accordingly, there is a urgent need for the persons skilled in the art to solve the technical problem of how to reduce the investment cost and improve the monitoring management of the public parking lots.

BRIEF SUMMARY OF THE INVENTION

The technical problem to be solved by the present invention is to provide an intelligent charging system and method for use in a parking lot, which can be used to reduce the investment cost and improve the monitoring management of public parking lots.

To solve the aforesaid problem, the present invention discloses an intelligent charging system for use in a parking lot, which comprises a detecting unit, an on-board unit and a corresponding means of payment. The on-board unit is disposed on a vehicle and configured to acquire a parking time parameter, derive a parking fee according to the parking time parameter and a rate parameter stored in the on-board unit, and deduct the parking fee from the means of payment. The detecting unit is configured to, through information interaction with the on-board unit, determine whether the on-board unit operates normally.

On the other hand, the present invention further discloses an intelligent charging method for use in a parking lot, which comprises the following steps of:

acquiring a parking time parameter by an on-board unit disposed on a vehicle;

deriving a parking fee according to the parking time parameter and a rate parameter stored in the on-board unit, and deducting the parking fee from a means of payment; and determining whether the on-board unit operates normally by a detecting unit through information interaction with the on-board unit.

As compared with the prior art, the present invention has the following advantages:

the detecting unit, the on-board unit and the corresponding means of payment are disposed in the intelligent charging system for use in a parking lot according to the present invention; on the one hand, the on-board unit and the corresponding means of payment can be used to accomplish payment of a parking fee; and on the other hand, an administrator of the parking lot can use the detecting unit to determine whether the on-board unit operates normally through information interaction so as to ensure legality of charging in the parking lot;

firstly, for vehicle owners, the on-board unit and the means of payment are convenient to use and highly efficient, can operate accurately and allow for unattended operation;

secondly, as compared with the existing parking meters, the detecting unit and the on-board unit need only a low cost, and the detecting unit does not need to occupy spaces of roads or parking lots;

thirdly, the present invention can carry out determination operations through long-range and intensive radio frequency identification (RFID) interaction; the RFID interaction can be carried out without the need of manual intervention and thus is applicable to various severe environments, and can identify a plurality of tags simultaneously and thus allow for convenient and rapid operations; therefore, various determination operations can be ensured to be implemented automatically, thereby reducing the personnel investment and the labor intensity of administrators of parking lots; and finally, the present invention can further encrypt and/or authenticate the data inside the on-board unit through an embedded secure access module (ESAM) so as to achieve secure payment and identity authentication, or encrypt and/or authenticate the data inside the detecting unit through a purchase secure access module (PSAM) to ensure security of information interaction in determination.

DETAILED DESCRIPTION OF THE INVENTION

In the following description, the present invention will be further detailed in conjunction with the accompanying drawings and embodiments in order to make the aforesaid objective, features and advantages of the present invention become more apparent.

Figure 1:
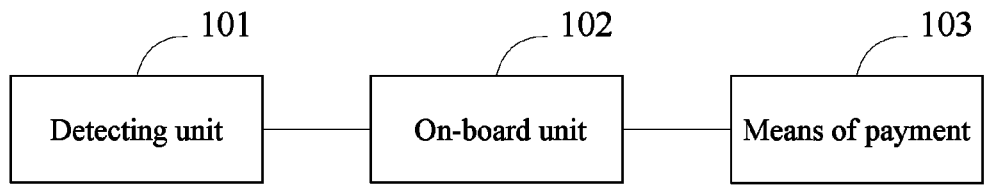
FIG. 1 is a structure diagram illustrating an embodiment 1 of an intelligent charging system for use in a parking lot of the present invention.

Referring to FIG. 1, there is shown a structure diagram illustrating an embodiment 1 of an intelligent charging system for use in a parking lot of the present invention. The system comprises a detecting unit 101, an on-board unit 102 and a corresponding means of payment 103.

The on-board unit 102 is disposed on a vehicle and configured to acquire a parking time parameter, derive a parking fee according to the parking time parameter and a rate parameter stored in the on-board unit, and deduct the parking fee from the means of payment 103. The detecting unit 101 is configured to, through information interaction with the on-board unit 102, determine whether the on-board unit 102 operates normally.

The core idea of this embodiment of the present invention lies in that: the detecting unit 101, the on-board unit 102 and the corresponding means of payment 103 are disposed in the intelligent charging system for use in a parking lot; on the one hand, a vehicle owner can use the on-board unit 102 and the corresponding means of payment 103 to accomplish payment of a parking fee; and on the other hand, an administrator of the parking lot can use the detecting unit 101 to determine whether the on-board unit 102 operates normally through information interaction so as to ensure legality of charging in the parking lot.

Hereinafter, the payment function and the determination function will be detailed respectively.

Payment Function

In specific application, the means of payment 103 may be one of existing means of payment such as public traffic cards, bank cards, mobile phones for mobile payment and URpasses (U-card passes). The following description will be made mainly by taking a public traffic card as an example, and for details related to other types of means of payment 103, reference may be made to this.

In terms of the way in which the means of payment 103 is recharged, electronic parking tickets may be bought by cash in a public traffic card recharging station for storage in the public traffic card, or electronic parking tickets may be bought through a short message for storage in the mobile phone; or the URpass may be recharged on line in a website of a mobile operator or an issuer of traffic cards through the Internet.

In an application example of the present invention, a clock module is disposed in the on-board unit 102; and the clock module can acquire the current time and calculate a total parking duration (i.e., a parking time parameter) according to a start parking time. A rate module may further be disposed in the on-board unit 102; and the rate module can have a rate schedule of the parking lot stored therein, so a rate parameter of the current parking lot can be selected automatically or manually. For example, the rate parameter may include RMB 0.5/half hour, RMB 1.0/half hour, timing being stopped after pm 5 o'clock and the like. The on-board unit 102 may further have a payment module disposed therein, which can firstly calculate a parking fee according to the parking time parameter and the rate parameter and then deduct the parking fee from the means of payment 103.

Taking the public traffic card as an example, when the vehicle owner swipes the card before parking the vehicle, the payment module can deduct all the parking tickets in the card; and when the vehicle owner swipes the card again before picking up the vehicle, the payment module can deduct the parking fee from all the parking tickets in the card and return the parking ticket balance to the card, thus completing the payment for this parking.

Accordingly, in the aforesaid example, the clock module, the rate module and the payment module cooperate with the means of payment 103 to accomplish the payment function. Moreover, depending on actual requirements, people skilled in the art can further provide in the on-board unit 102 other modular structures capable of cooperating with the means of payment 103 to accomplish the payment function, and the present invention has no limitation thereon.

Figure 2:
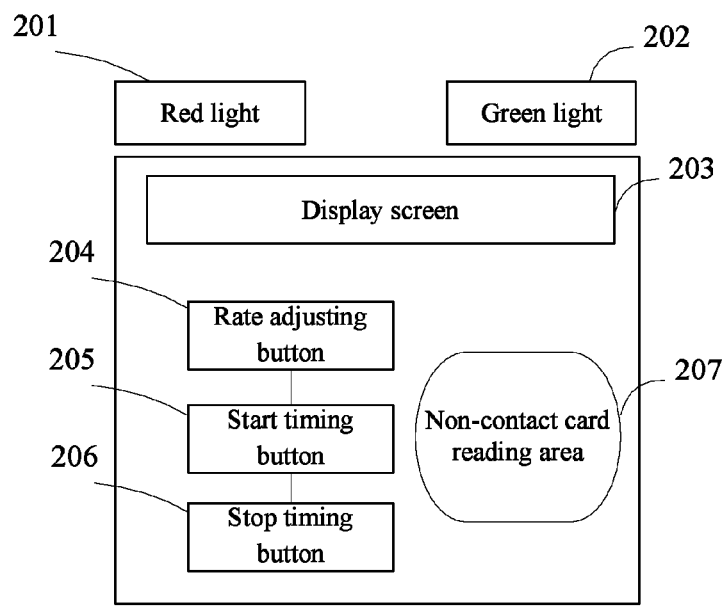
FIG. 2 is a schematic view illustrating an appearance of an on-board unit 102 of the present invention.

Referring to FIG. 2, there is shown a schematic view illustrating an appearance of an on-board unit 102 of the present invention. Components and functions thereof of the on-board unit 102 are as follows:

a red light 201: being an indicator light configured to blink when the parking ticket balance in the card is not enough and/or when an abnormal condition is detected by the detecting unit 101;

a green light 202: being an indicator light configured to blink once every 5 seconds in a normal operating status;

a display screen 203: being configured to display a start parking time and an accumulated parking duration;

a rate adjusting button 204: being configured to select a corresponding rate according to rate standards of different parking areas, wherein for example, the rate may include RMB 0.5/half hour, RMB 1.0/half hour, and timing being stopped after pm 5 o'clock;

a start timing button 205: when this button is pressed down, the timing being started;

a stop timing button 206: when this button is pressed down, the timing being stopped; and a non-contact card reading area 207: being an area where the means of payment 103 swipes the card for consumption.

For example, when parking the vehicle, the vehicle owner can place the on-board unit 102 at a front windshield of the vehicle with the display screen of the on-board unit 102 facing outwards while setting the rate parameter of the current parking lot according to provisions, and then activate the on-board unit 102 by pressing down the "start timing button 205"; and when the parking is ended, the vehicle owner can shut down the on-board unit 102 by pressing down the "stop timing button 206" after payment of the parking fee.

As can be seen, the on-board unit 102 and the means of payment 103 are convenient to use and highly efficient, can operate accurately and allow for unattended operation.

As can be appreciated, the appearance of the on-board unit 102 and the provided functional buttons shown in FIG. 2 are only illustrative. Depending on actual requirements, people skilled in the art may provide other appearances or other functional buttons (e.g., modify the non-contact card reading area 207 shown in FIG. 2 into a contact card inserting area) as long as the on-board unit 102 and the means of payment 103 cooperate to accomplish the payment of the parking fee. The present invention has no limitation on the specific functional buttons of the on-board unit 102 and the specific interface between the on-board unit 102 and the means of payment 103.

FIG. 2 illustrates that a user selects a rate manually through the rate adjusting button 204. Understandably, the on-board unit 102 can further select the rate automatically according to a downloaded rate schedule of the parking lot and an internal clock. People skilled in the art can select any one of the manual mode and the automatic mode depending on actual requirements, and the present invention has no limitation thereon.

Determination Function

To ensure legality of charging in the parking lot, the administrator of the parking lot can use the detecting unit 101 to determine whether the on-board unit 102 operates normally; and specifically, the detecting unit 101 can carry out determination operations through information interaction with the on-board unit 102.

In practice, the information interaction between the detecting unit 101 and the on-board unit 102 can be carried out in many ways. For example, the infrared communication technology is a wireless communication technology that is much mature in recent years and has advantages such as a large market scale etc. However, the infrared communication technology is limited in communication distance, liable to be blocked by opaque objects and incapable of accomplishing automatic determination, so manual alignment is required in order to successfully achieve the interaction and the interaction cannot be achieved once the vehicle owner places the on-board unit 102 in a wrong direction.

In view of the disadvantages of the infrared communication technology, the radio frequency identification (RFID) technology is preferably adopted in this embodiment of the present invention to achieve the information interaction between the detecting unit 101 and the on-board unit 102. The RFID technology automatically identifies a target object and acquires related data through an RF signal without the need of manual intervention, so it is applicable to various severe environments; moreover, the RFID technology can identify a plurality of tags simultaneously and thus allow for convenient and rapid operations.

Specifically, in this embodiment of the present invention, during the interaction, the detecting unit 101 of the RFID wireless system can send an inquiry signal to a plurality of on-board units 102 in the parking lot, and each of the on-board units 102 can respond to the inquiry signal primarily.

The RFID operates in a plurality of frequency bands, for example, a low frequency band below 135 KHz, a high frequency band of 13.56 MHz, an ultra-high frequency band ranging from 860 MHz to 960 MHz, microwaves of 2.4 GHz and 5.8 GHz and so on.

For the frequency tag (the on-board unit 102) side, this embodiment of the present invention can achieve the information interaction with the detecting unit 101 in a frequency band of 915 MHz which has advantages of a low cost and a communication distance of up to 10 meters; or the 2.4 GHz frequency tag may be used which has advantages of a high frequency and a large information communication amount; or the 5.8 GHz frequency tag may be used. Accordingly, people skilled in the art can use different RFID frequency bands depending on actual requirements, and the present invention has no limitation thereon.

Figure 3:
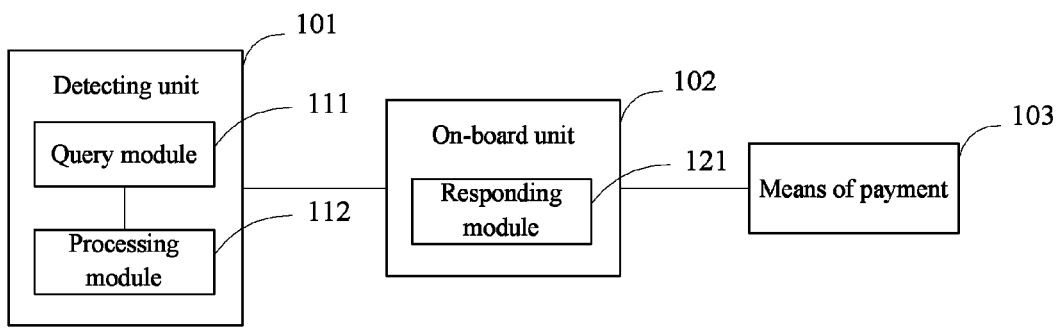
FIG. 3 is a structure diagram illustrating a preferred embodiment of the embodiment 1 of the intelligent charging system for use in a parking lot shown in FIG. 1.

Referring to FIG. 3, the interaction between the detecting unit 101 and the on-board unit 102 will be described. In a preferred embodiment of the present invention, the detecting unit 101 comprises a query module 111 configured to send query information to the on-board unit 102. The on-board unit 102 comprises a responding module 121 configured to send status information of the on-board unit 102 to the detecting unit 101 according to the query information. The detecting unit 101 further comprises a processing module 112 configured to determine whether the on-board unit 102 operates normally according to the status information of the on-board unit 102 and legal information of the on-board unit 102 stored in the detecting unit 101.

In a preferred embodiment of the present invention, the administrator of the parking lot can further carry out subsequent processing according to a determination result of the determination made on the on-board unit 102 by the processing module 112. The subsequent processing may mainly comprise punishment processing, which is carried out when the determination result of the determination made on the on-board unit 102 is "No" (i.e., when the on-board unit 102 operates abnormally).

As an example, the detecting unit 101 may further comprise a ticket generating module, which is configured to generate a ticket when the determination result of the determination made on the on-board unit 102 is "No".

As another example, the detecting unit 101 may further comprise an alerting module, which is configured to give an alert when the determination result of the determination made on the on-board unit 102 is "No".

For various determination operations, the query information may comprise: vehicle query information, operating status query information of the on-board unit 102, rate standard query information, or clock query information. Hereinafter, the aforesaid query information will be described respectively.

1. Vehicle Query Information

Assuming that the administrator of the parking lot is to determine whether the on-board unit 102 matches with the vehicle in which it is located, then the vehicle query information can be sent.

In practice, the detecting unit 101 pre-stores the legal information of the on-board unit 102, for example, the number of the vehicle in which the on-board unit 102 is located; and when the on-board unit 102 does not match with the vehicle in which it is located (i.e., the on-board unit 102 is illegal), the ticket generating module can be used to issue a ticket.

2. Operating Status Query Information of the On-Board Unit 102

In practice, the administrator of the parking lot can determine whether the on-board unit 102 is in a normal operating status by sending the operating status query information through the detecting unit 101.

For example, if the determination result is "Yes" (i.e., the on-board unit 102 operates normally), then the detecting unit 101 can indicate that the on-board unit 102 operates normally through a buzzer and the indicator lights of the on-board unit 102; otherwise, if the determination result indicates that the on-board unit 102 operates abnormally, then the alerting module can be used to give an alert.

3. Rate Standard Query Information

As mentioned above, the rate module in the on-board unit 102 can select the rate parameter of the current parking lot automatically or manually according to the stored rate schedule of the parking lot. In this way, in order to avoid insufficient payment caused by the false rate standard used by the vehicle owner (e.g., the rate parameter of the current parking lot is RMB 1.0/half hour while the vehicle owner pays the parking fee according to the rate parameter of RMB 0.5/half hour), the administrator of the parking lot can determine whether the on-board unit 102 has selected a correct rate standard by sending the rate standard query information.

Thus, the detecting unit 101 may further comprise a rate updating module, which is configured to correct a rate standard through information interaction when the determination result of the determination made on the on-board unit 102 is "No".

4. Clock Query Information

As mentioned above, the clock module in the on-board unit 102 can acquire the current time and the start parking time to calculate the total parking duration (i.e., the parking time parameter). In this way, in order to avoid insufficient payment caused by the false clock used by the vehicle owner (e.g., the vehicle owner adjusts the clock backwards), the administrator of the parking lot can determine whether the on-board unit 102 has selected a correct clock by sending the clock query information.

In this case, the detecting unit 101 may further comprise a clock correcting module, which is configured to correct a clock of the on-board unit 102 through information interaction when the determination result of the determination made on the on-board unit 102 is "No".

The vehicle query information, the operating status query information, the rate standard query information and the clock query information have been described in detail above. Understandably, the query information for determination on the on-board unit 102 is not limited to the aforesaid four types of query information in this embodiment of the present invention; and people skilled in the art may set other query information depending on actual requirements (e.g., by reading the parking time and an appointment time, the detecting unit 101 can automatically determine whether the time set by the on-board unit 102 is normal), and the present invention has no limitation thereon.

Additionally, the subsequent processing based on the determination result is not limited to ticket generation, alerting, clock correction, rate updating and the like in the example.

Moreover, for the aforesaid determination operations and subsequent processing operations, the detecting unit 101 can be set into a manual mode and an automatic mode. The automatic mode refers to one or more of the vehicle query information, the operating status query information, the rate standard query information and the clock query information. Taking the combination of the vehicle query information and the operating status query information as an example, the vehicle query information can be firstly sent before the operating status query information is sent.

Furthermore, the password protection function of the detecting unit 101 can be set; i.e., different levels of passwords can be used to set permissions and manage the detecting unit. For example, an administrator of a parking lot having a permission of 0 can only send the vehicle query information; an administrator of a parking lot having a permission of 1 can send the vehicle query information and the operating status query information; an administrator of a parking lot having a permission of 2 can perform all the determination operations but cannot perform the subsequent processing operations; and an administrator of a parking lot having a permission of 3 can perform both the determination operations and the subsequent processing operations.

Finally, the detecting unit 101 can have the memory function to record all the data during the determination operations and the subsequent processing operations.

To ensure security of the data during the payment of the parking fee and the information interaction, in a preferred embodiment of the present invention, the on-board unit 102 may further comprise an embedded secure access module (ESAM), which is configured to encrypt and/or authenticate the data inside the on-board unit 102.

When the on-board unit 102 operates, all the data operated by the on-board unit 102 can be written and stored into the ESAM.

For example, when the user places the public traffic card above the non-contact card reading area of FIG. 2 to swipe the card before parking, the ESAM will firstly authenticate the public traffic card and, if the public traffic card passes the authentication, deduct all the parking tickets in the card. Thereby, secure payment and identity anti-fake can be achieved.

Similarly, in another preferred embodiment of the present invention, the detecting unit 101 may further comprise a purchase secure access module (PSAM), which is configured to encrypt and/or authenticate the data inside the detecting unit 101.

The PSAM can store the data operated by the detecting unit 101. The data operated by the detecting unit 101 may comprise the data sent to the on-board unit 102, and this ensures security of the information interaction during the determination operations and the subsequent processing operations.

Figure 4:
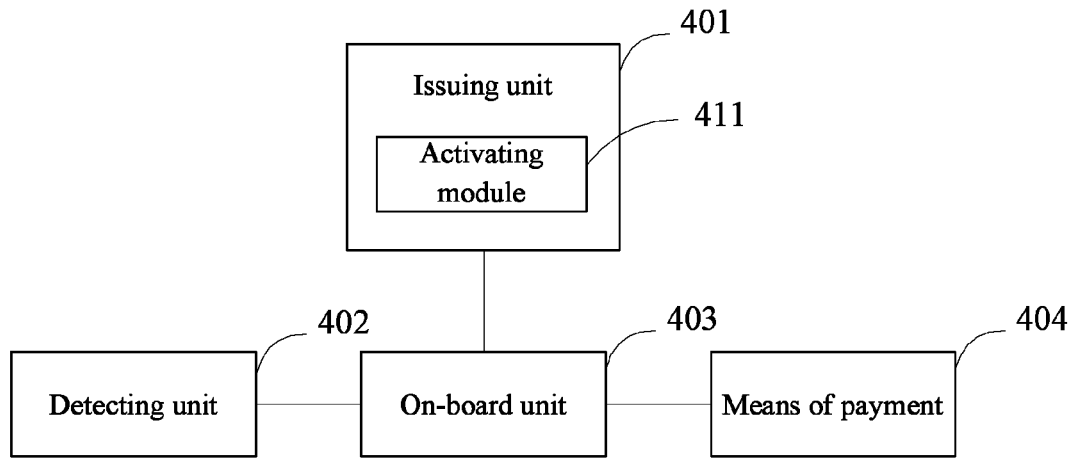
FIG. 4 is a structure diagram illustrating an embodiment 2 of an intelligent charging system for use in a parking lot of the present invention.

Referring to FIG. 4, there is shown a structure diagram illustrating an embodiment 2 of an intelligent charging system for use in a parking lot of the present invention. The system may comprise an issuing unit 401, a detecting unit 402, an on-board unit 403 and a corresponding means of payment 404. The issuing unit 401 may comprise an activating module 411 configured to activate the on-board unit 403. The on-board unit 403 is disposed on a vehicle and configured to acquire a parking time parameter, derive a parking fee according to the parking time parameter and a rate parameter stored in the on-board unit 403, and deduct the parking fee from the means of payment 404. The detecting unit 402 is configured to, through information interaction with the activated on-board unit 403, determine whether the on-board unit 403 operates normally.

This embodiment differs from the embodiment 1 in that: only through the activation operation of the issuing unit 401, the on-board unit 403 can cooperate with the corresponding means of payment 404 to accomplish the payment function;

and the detecting unit 402 can interact with the on-board unit 403 to accomplish the determination operations. The aforesaid activation operation can assist to manage the on-board unit 403 to ensure legality of charging in the parking lot.

Figure 5:
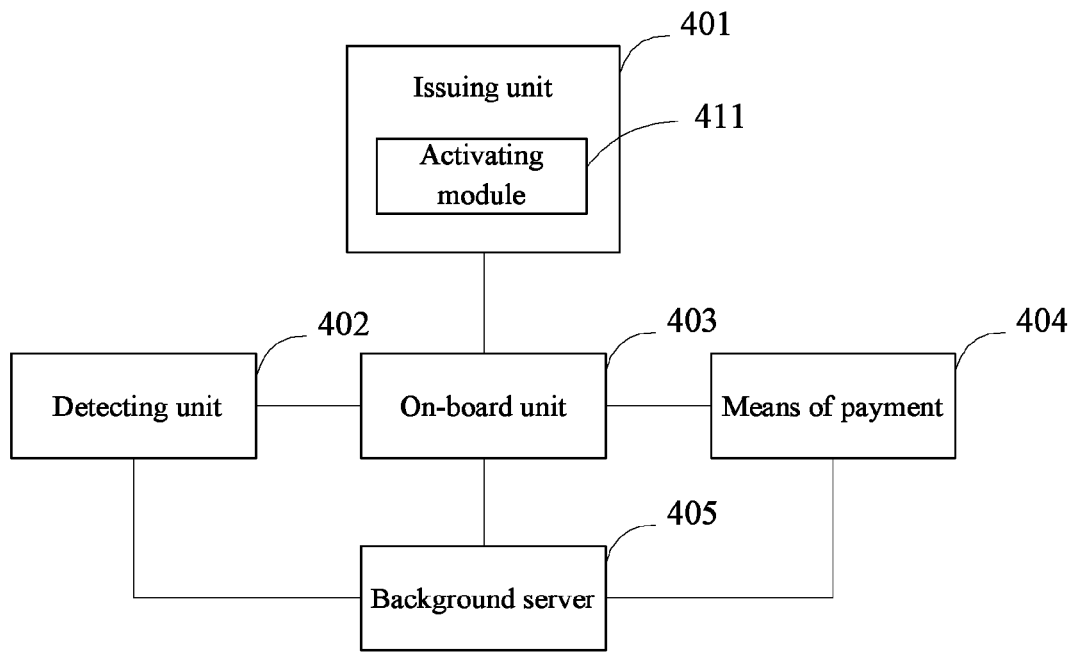
FIG. 5 is a structure diagram illustrating a preferred embodiment of the embodiment 2 of the intelligent charging system for use in a parking lot shown in FIG. 4.

Referring to FIG. 5, in a preferred embodiment of the present invention, the system may further comprise a background server 405 configured to process data. The data may be from any one or more of the on-board unit 403, the detecting unit 402 and the issuing unit 401.

The following schemes for processing the data can be provided in this embodiment.

Scheme 1

Figure 6:
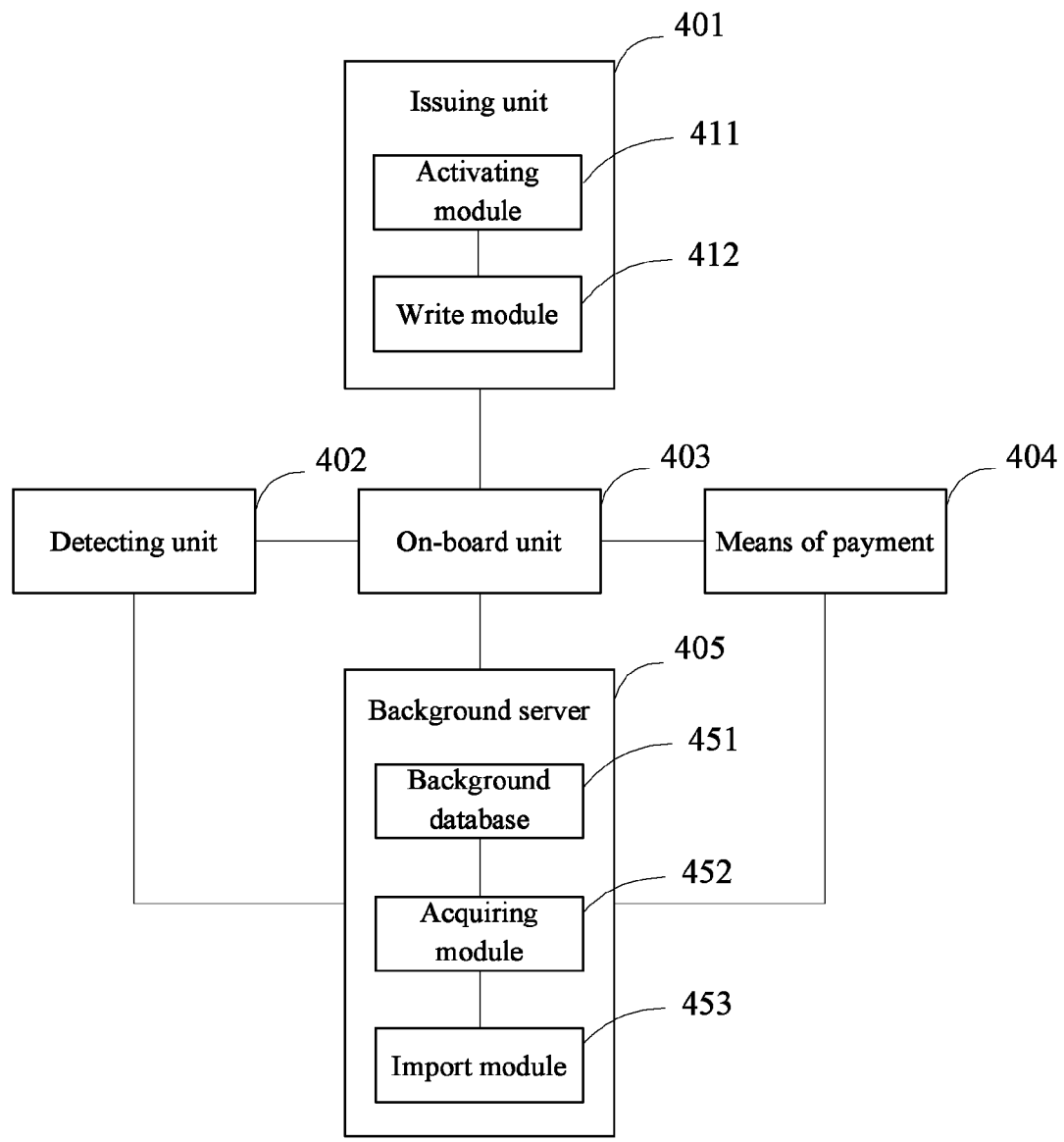
FIG. 6 is a structure diagram illustrating a preferred embodiment of the embodiment of the intelligent charging system for use in a parking lot shown in FIG. 5.

Preferably, the background server 405 can assist in the aforesaid activation operation. Referring to FIG. 6, the background server 405 may comprise a background database 451; an acquiring module 452, being configured to acquire and save vehicle information and vehicle owner information of the on-board unit into the background database 451; and an import module 453, being configured to import the vehicle information and the vehicle owner information of the on-board unit from the background database into the detecting unit 402 as the legal information. Correspondingly, the issuing unit 401 may further comprise a write module 412 configured to write the vehicle information and the vehicle owner information into the corresponding on-board unit when the on-board unit is activated.

In practice, the vehicle owner can carry his/her valid identification and vehicle identification certification to handle the activation of the on-board unit 403 in a designated place. In this case, the acquiring module 452 can enter into the background database 451 the valid identification as the vehicle owner information and the vehicle identification certification as the vehicle information.

Scheme 2

In a preferred embodiment of the embodiment shown in FIG. 6, the determination result of the determination made on the on-board unit 403 by the detecting unit 402 can be shared with the vehicle owner in real time.

Figure 7:
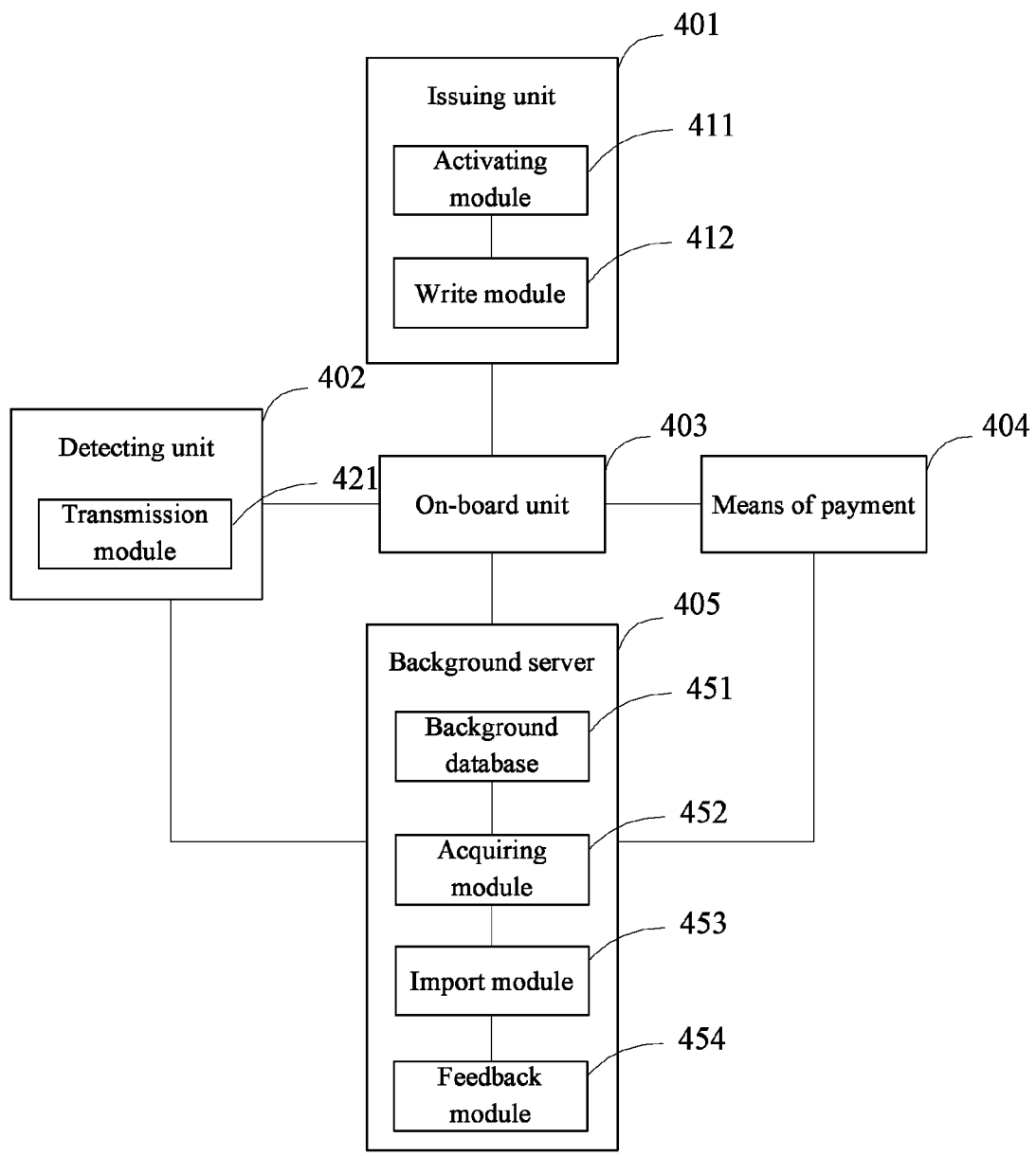
FIG. 7 is a structure diagram illustrating a preferred embodiment of the embodiment of the intelligent charging system for use in a parking lot shown in FIG. 6.

Referring to FIG. 7, the detecting unit 402 may further comprise a transmission module 421, which is configured to transmit the determination result of the determination made on the on-board unit to the background server 405. The background server 405 may comprise a feedback module 454, which is configured to feed back the determination result to the corresponding vehicle owner according to the vehicle owner information of the on-board unit.

For example, the detecting unit 402 can transmit information to the background server 405 in real time through the general packet radio service (GPRS) technology so as to feed back the determination result of the determination made on the on-board unit 403 to the background server 405 timely. Thus, when the vehicle owner information is a telephone number, the feedback module 454 can feed back the determination result to the vehicle owner via a short message through a communication operator, thereby achieving information sharing in real time. Understandably, all the interaction data for the on-board unit can be stored into the background server 405; therefore, the detecting unit 402 can automatically import the memory content into the background server 405, and format an access area thereof.

In order to make the present invention better understood by people skilled in the art, the operation flow of the intelligent charging system for use in a parking lot of the present invention will be described in conjunction with an example hereinafter.

Figure 8:
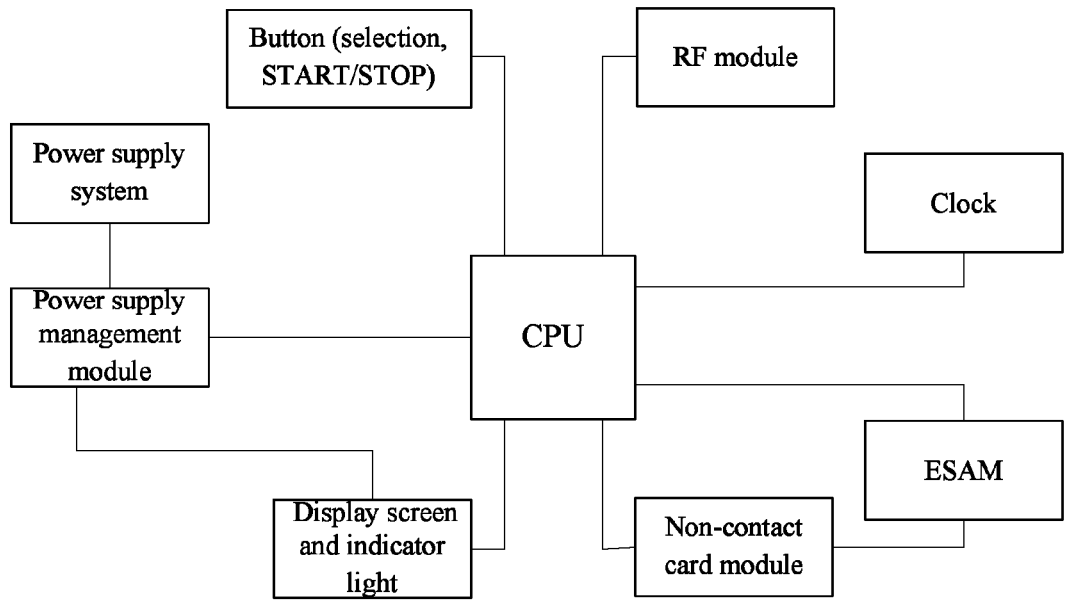
FIG. 8 illustrates an application example of an on-board unit of the present invention.

Referring to FIG. 8, the on-board unit in this example may comprise:

a central processing unit (CPU);

a button (selection, START/STOP), being configured to operate and control the on-board unit, for example, select a corresponding rate according to rate standards of different parking areas and start/stop timing;

an RF module, being configured to receive/transmit an RF signal;

a clock, being configured to provide the current time and calculate the total parking duration according to the start parking time;

an ESAM, being configured to ensure security during the use of the means of payment;

a power supply system, being configured to supply power required for normal operation of the on-board unit, wherein the power supply system may be one dry battery and typically, one dry battery can operate normally for one and a half years to two years;

a power supply management module, being configured to manage the power supply system;

a display screen and an indicator light, being configured to display the start parking time and the accumulated parking duration and indicate the current operating status; and a non-contact card module, being configured to read/write data from the means of payment.

Figure 9:
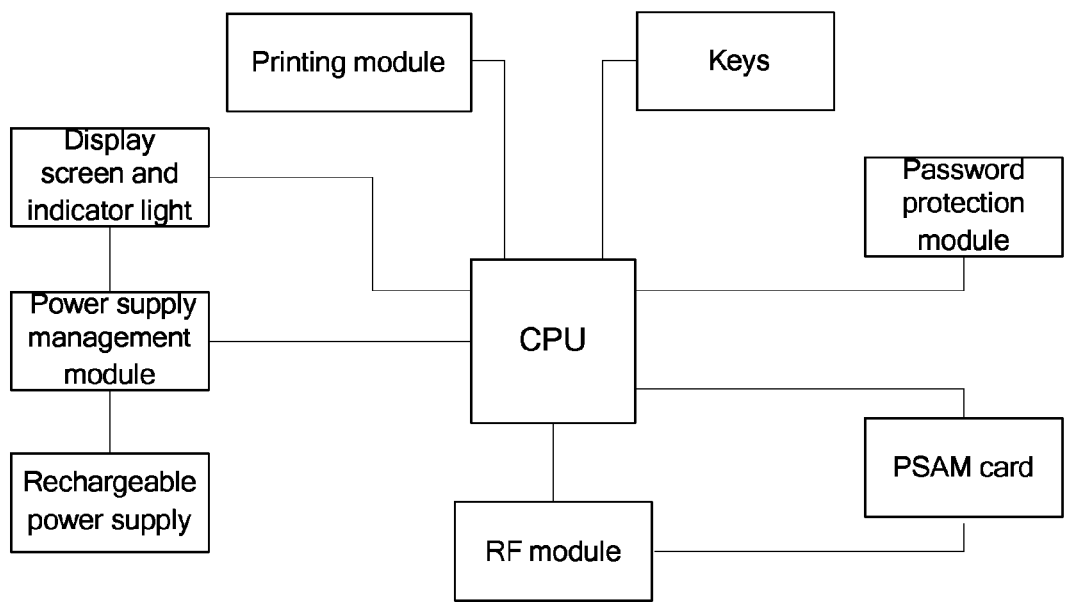
FIG. 9 illustrates an application example of a detecting unit of the present invention.

Referring to FIG. 9, the detecting unit in this example may comprise:

a CPU;

a printing module, being configured to print the data (e.g., tickets) during the determination operations;

keys, being configured to accept characters such as letters, numerals and symbols inputted by the user;

a password protection module, being configured to set permissions and manage the detecting unit through different levels of passwords;

a PSAM card, being configured to ensure security during the determination operations;

an RF module, being configured to receive/transmit an RF signal (e.g., a microwave signal);

a rechargeable power supply, being configured to supply power required for normal operation of the detecting unit, wherein the rechargeable power supply can be recharged in real time;

a power supply management module, being configured to manage the rechargeable power supply; and a display screen and an indicator light.

The detecting unit keeps in a microwave transmitting status after being activated, and can actively waken the on-board unit that can operate normally into the operating status; i.e., when there is an on-board unit within the microwave signal range of the detecting unit, the RF module in the on-board unit is activated to interact with the detecting unit for the determination operations.

Taking clock query and clock correction performed on the on-board unit by the detecting unit as an example, the clock query and the clock correction may comprise a step S1, a step S2, a step S3 and a step S4.

In the step S1, the CPU of the detecting unit transmits clock query information to the on-board unit through the RF module.

In the step S2, the CPU of the on-board unit acquires clock information of the on-board unit according to the clock query information received by the RF module of the on-board unit, and transmits the clock information to the detecting unit through the RF module of the on-board unit.

In the step S3, the CPU of the detecting unit compares the clock information of the on-board unit with legal clock information and, if the clock information of the on-board unit does not match with the legal clock information, transmits clock correcting information to the on-board unit through the RF module.

In the step S4, after the clock correcting information is received, the CPU of the on-board unit accurately corrects the clock.

It shall be appreciated that, if the microwave signal detects that there is no on-board unit within the vehicle, then an alert can be given through the buzzer, the indicator light and the display screen etc.

As can be appreciated, after the clock is corrected, the on-board unit can further modify the time difference caused by the inaccurate clock and display this through the display screen; and the detecting unit can further record the data in the aforesaid query and correction process.

Additionally, apart from the clock correction, the detecting unit and the on-board unit in this example can further accomplish other determination operations and subsequent processing operations (e.g., rate standard query and updating) through interaction, and the present invention has no limitation thereon.

Figure 10:
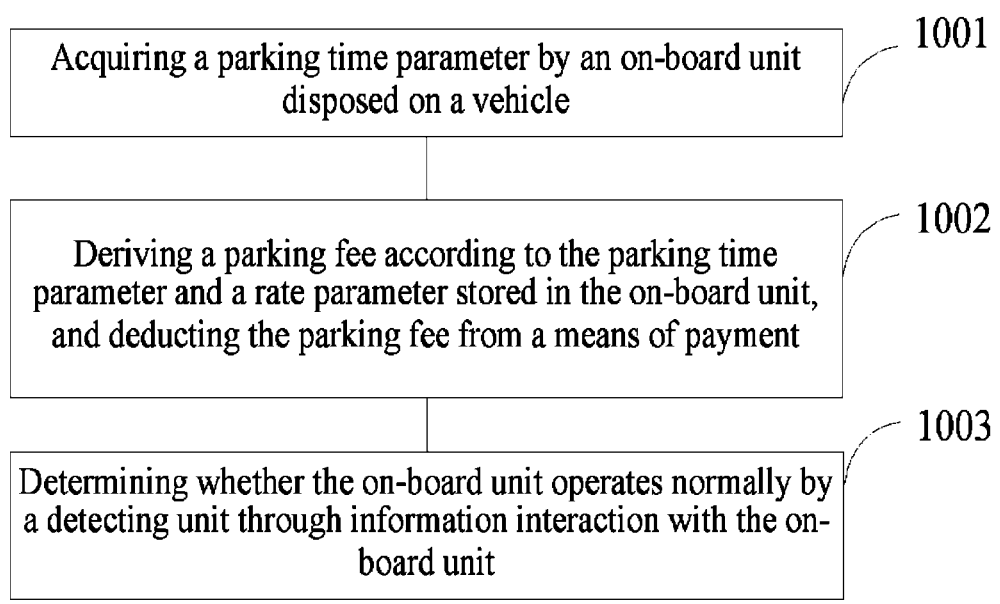
FIG. 10 is a flowchart illustrating an embodiment of an intelligent charging method for use in a parking lot of the present invention.

Corresponding to the aforesaid embodiment of the system, the present invention also discloses an embodiment of an intelligent charging method for use in a parking lot. Referring to FIG. 10, the method may comprise a step 1001, a step 1002 and a step 1003.

In the step 1001, an on-board unit disposed on a vehicle acquires a parking time parameter. In practice, the on-board unit can calculate a total parking duration (i.e., a parking time parameter) according to a start parking time.

In the step 1002, a parking fee is derived according to the parking time parameter and a rate parameter stored in the on-board unit, and the parking fee is deducted from a means of payment.

In practice, the on-board unit can download and store a rate schedule of the parking lot and select a rate parameter of the current parking lot according to the rate schedule of the parking lot. For example, the rate parameter may include RMB 0.5/half hour, RMB 1.0/half hour, timing being stopped after pm 5 o'clock and the like. Thus, the parking fee can be calculated according to the parking time parameter and the rate parameter, and then the parking fee can be deducted from the means of payment.

Taking the public traffic card as an example, when the vehicle owner swipes the card before getting off, all the parking tickets in the card can be deducted; and when the vehicle owner swipes the card again before picking up the vehicle, the calculated parking fee can be deducted from all the parking tickets in the card and then the parking ticket balance is returned to the card, thus completing the payment for this parking. Of course, the card may also be swiped to deduct the parking fee only when the vehicle is picked up.

In the step 1003, a detecting unit determines whether the on-board unit operates normally through information interaction with the on-board unit.

In this embodiment of the present invention, the administrator of the parking lot can use the detecting unit to carry out information interaction with the on-board unit. The information interaction can be carried out in many ways, for example, through the infrared communication technology or the RFID technology. The RFID technology can perform identification without the need of manual intervention and thus is applicable to various severe environments, and can identify a plurality of tags simultaneously and thus allow for convenient and rapid operations. Therefore, preferably, the RFID technology is adopted in this embodiment of the present invention to carry out the information interaction with the on-board unit.

In order to detail the interaction between the detecting unit and the on-board unit, in a preferred embodiment of the present invention, the step 1003 may comprise:

sending query information by the detecting unit to the on-board unit;

sending status information of the on-board unit by the on-board unit to the detecting unit according to the query information; and determining by the detecting unit whether the on-board unit operates normally according to the status information of the on-board unit and legal information of the on-board unit stored in the detecting unit.

For various determination operations, the query information may comprise: vehicle query information, operating status query information of the on-board unit, rate standard query information, or clock query information etc. The detailed description of the query information is the same as that in the embodiment of the system, and thus will not be further described herein.

In a preferred embodiment of the present invention, the administrator of the parking lot can further carry out subsequent processing according to a determination result of the determination made on the on-board unit. The subsequent processing may comprise punishment processing, which is carried out when the determination result of the determination made on the on-board unit 102 is "No" (i.e., when the on-board unit operates abnormally).

For example, the method may further comprise:

generating a ticket when the determination result of the determination made on the on-board unit is "No"; or giving an alert when the determination result of the determination made on the on-board unit is "No"; and so on.

The subsequent processing may further comprise correction processing, which is carried out when the on-board unit operates abnormally.

For example, the method may further comprise:

correcting a clock of the on-board unit through information interaction when the query information is the clock query information and the determination result is "No"; or correcting a rate standard through information interaction when the query information is the rate standard query information and the determination result is "No"; and so on.

In order to facilitate management of the on-board unit to ensure legality of charging in the parking lot, in another preferred embodiment of the present invention, the method may further comprise:

activating the on-board unit by an issuing unit; and processing data by a background server, wherein the data is from any one or more of the on-board unit, the detecting unit and the issuing unit.

The following schemes for processing the data can be provided in this embodiment.

Scheme 1

Preferably, the background server can assist in the aforesaid activation operation. In this case, the method may further comprise:

acquiring and saving, by the background server, vehicle information and vehicle owner information of the on-board unit;

importing the vehicle information and the vehicle owner information of the on-board unit as the legal information by the background server into the detecting unit; and activating the on-board unit and writing the vehicle information and the vehicle owner information into the corresponding on-board unit by the issuing unit.

Scheme 2

In a preferred embodiment of the present invention, the determination result of the determination made on the on-board unit by the detecting unit can be shared with the vehicle owner in real time. Specifically, the method may further comprise:

transmitting by the detecting unit the determination result of the determination made on the on-board unit to the background server; and feeding back the determination result to the corresponding vehicle owner by the background server according to the vehicle owner information of the on-board unit.

For example, information can be transmitted to the background server in real time through the GPRS technology so as to send the determination result of the determination made on the on-board unit to the background server timely. Thus, when the vehicle owner information is a telephone number, the determination result can be fed back to the vehicle owner via a short message through a communication operator, thereby achieving information sharing in real time.

To ensure security of the data during the payment of the parking fee and the information interaction, in a preferred embodiment of the present invention, the method may further comprise:

encrypting and/or authenticating the data inside the on-board unit by an ESAM disposed in the on-board unit.

In this way, when the on-board unit operates, all the data operated by the on-board unit can be written and stored into the ESAM.

For example, when the user places the public traffic card above the non-contact card reading area of FIG. 2 to swipe the card before parking, the ESAM will firstly authenticate the public traffic card and, if the public traffic card passes the authentication, deduct all the parking tickets in the card. Thereby, secure payment and identity anti-fake can be achieved.

The embodiments in this specification are all described in a progressive way. Description of each of the embodiments focus on differences from other embodiments, and reference could be made to each other for the same or similar part among respective embodiments. The embodiments of the method are substantially similar to the embodiments of the system and thus described in a relatively simple way, and the associated parts thereof can be understood with reference to the embodiments of the system.

The present invention can be applied to various public parking lots such as roadside temporary parking lots to reduce the investment cost and improve the monitoring management of the public parking lots.

The intelligent charging system and method for use in a parking lot of the present invention have been described in detail above. Specific examples are used herein to elucidate the principles and embodiments of the present invention. The description of the above embodiments is only intended to facilitate understanding of the method and the core idea thereof of the present invention. Meanwhile, those of ordinary skill in the art may make some changes to the embodiments and the application range based on the idea of the present invention. Accordingly, what described in this specification shall not be construed to limit the present invention.

The invention claimed is:

1. An intelligent charging system for use in a parking lot, the intelligent charging system comprising:
    an on-board unit,
    a detecting unit, and
    a means of payment,
    wherein:
    the on-board unit is disposed on a vehicle and configured to calculate a total parking duration of the vehicle as a parking time parameter, derive a parking fee according to the parking time parameter and a rate parameter stored in the on-board unit, and deduct the parking fee from the means of payment via a payment module;
    the detecting unit is configured to, through information interaction with the on-board unit, determine whether the on-board unit operates normally;
    the detecting unit comprises a query module configured to send a query to the on-board unit;
    the on-board unit comprises a responding module configured to send status information of the on-board unit to the detecting unit in response to the query; and
    the detecting unit further comprises a processing module configured to determine whether the on-board unit operates normally based on the status information of the on-board unit and legal information of the on-board unit stored in the detecting unit.

2. The intelligent charging system of claim 1, wherein the query comprises one or more of vehicle query information, operating status query information of the on-board unit, rate standard query information, and clock query information.

3. The intelligent charging system of any one of claim 1 and claim 2, further comprising one or more of:
    an issuing unit comprising an activating module configured to activate the on-board unit; and
    a background server configured to process data, wherein the data is from any one or more of the on-board unit, the detecting unit and the issuing unit.

4. The intelligent charging system of claim 3, wherein:
    the background server comprises:
        a background database;
        an acquiring module configured to acquire and save vehicle information and vehicle owner information of the on-board unit into the background database; and
        an import module configured to import the vehicle information and the vehicle owner information of the on-board unit from the background database into the detecting unit as the legal information; and
    the issuing unit further comprises a write module configured to write the vehicle information and the vehicle owner information into the corresponding on-board unit when the on-board unit is activated.

5. The intelligent charging system of claim 4, wherein:
    the detecting unit further comprises a transmission module, which is configured to transmit a determination result of the determination made on the on-board unit by the processing module to the background server;
    the background server comprises a feedback module, which is configured to feed back the determination result to a vehicle owner according to the vehicle owner information of the on-board unit.

6. The intelligent charging system of claim 3, wherein the detecting unit further comprises one or more of:
    a ticket generating module configured to generate a ticket when a determination result of the determination made on the on-board unit by the processing module is "No";
    an alerting module configured to give an alert when the determination result of the determination made on the on-board unit by the processing module is "No";
    a clock correcting module configured to correct a clock of the on-board unit through information interaction when the query is a clock query information and the determination result of the determination made on the on-board unit by the processing module is "No";

a rate updating module configured to correct a rate standard through information interaction when the query is a rate standard query information and the determination result of the determination made on the on-board unit by the processing module is "No"; and a purchase secure access module (PSAM) configured to encrypt and/or authenticate the data in the detecting unit.

7. The intelligent charging system of claim 3, wherein the on-board unit further comprises:

an embedded secure access module (ESAM) configured to encrypt and/or authenticate the data in the on-board unit.

8. An intelligent charging method for use in a parking lot, the intelligent charging method comprising steps of:

calculating a total parking duration of a vehicle as a parking time parameter by an on-board unit disposed on the vehicle, wherein the parking time parameter is based on user inputs;

deriving a parking fee according to the parking time parameter and a rate parameter stored in the on-board unit, and deducting the parking fee from a means of payment via a payment module; and determining whether the on-board unit operates normally by a detecting unit through information interaction with the on-board unit;

wherein the step of determining whether the on-board unit operates normally comprises:

sending a query by the detecting unit to the on-board unit;

sending status information of the on-board unit by the on-board unit to the detecting unit in response to the query; and determining by the detecting unit whether the on-board unit operates normally based on the status information of the on-board unit and legal information of the on-board unit stored in the detecting unit.

9. The intelligent charging method of claim 8, wherein the query comprises vehicle query information, operating status query information of the on-board unit, rate standard query information, or clock query information.

10. The intelligent charging method of any one of claim 8 and claim 9, further comprising:

activating the on-board unit by an issuing unit; and processing data by a background server, wherein the data is from any one or more of the on-board unit, the detecting unit and the issuing unit.

11. The intelligent charging method of claim 10, further comprising:

acquiring and saving, by the background server, vehicle information and vehicle owner information of the on-board unit;

importing the vehicle information and the vehicle owner information of the on-board unit by the background server as the legal information into the detecting unit; and activating the on-board unit and writing the vehicle information and the vehicle owner information into the corresponding on-board unit by the issuing unit.

12. The intelligent charging method of claim 11, further comprising:

transmitting to the background server by the detecting unit a determination result of the determination made on the on-board unit; and feeding back the determination result to the corresponding vehicle owner by the background server according to the vehicle owner information of the on-board unit.

13. The intelligent charging method of claim 10, further comprising:

generating a ticket when a determination result of the determination made on the on-board unit is "No"; or giving an alert when the determination result of the determination made on the on-board unit is "No"; or correcting a clock of the on-board unit through information interaction when the query is the clock query information and a determination result of the determination made on the on-board unit is "No"; or correcting a rate standard through information interaction when the query is a rate standard query information and the determination result of the determination made on the on-board unit is "No".

14. The intelligent charging method of claim 10, further comprising:

encrypting and/or authenticating the data in the on-board unit by an embedded secure access module (ESAM) disposed in the on-board unit.

* * * * *